United States Patent

[11] 3,631,727

| [72] | Inventor | Fred K. White<br>Glen Ellyn, Ill. |
|---|---|---|
| [21] | Appl. No. | 883,836 |
| [22] | Filed | Dec. 10, 1969 |
| [45] | Patented | Jan. 4, 1972 |
| [73] | Assignee | Mulwhiteson Development Company<br>Glen Ellyn, Ill. |

[54] DEVICE FOR MEASURING SPECIFIC GRAVITY OF FLUIDS
6 Claims, 4 Drawing Figs.

| [52] | U.S. Cl. | 73/440 |
|---|---|---|
| [51] | Int. Cl. | G01n 9/10 |
| [50] | Field of Search | 73/440, 445, 444, 32, 434, 452 |

[56] References Cited
UNITED STATES PATENTS

| 829,460 | 8/1906 | Bunce | 73/440 |
|---|---|---|---|
| 1,567,821 | 12/1925 | Sweetland | 73/445 |
| 3,460,395 | 8/1969 | Shaw | 73/440 |

Primary Examiner—Richard C. Queisser
Assistant Examiner—Ellis J. Koch
Attorney—John L. Hutchinson ABSTRACT: This invention is directed to a device for continuously monitoring or testing the specific gravity of a fluid. The device consists of a plurality of chambers connected in series. Each chamber contains a ball capable of floating at a different predetermined specific gravity. Fluid is sequentially passed through the chambers and the specific gravity of the fluid in each chamber will determine whether the ball in the chamber will or will not float. Floatation of each ball can be used to determine a specific gravity range or change.

PATENTED JAN 4 1972 3,631,727
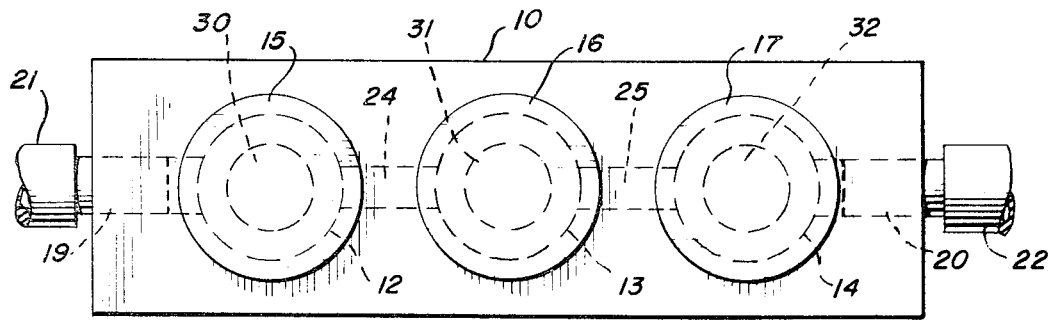
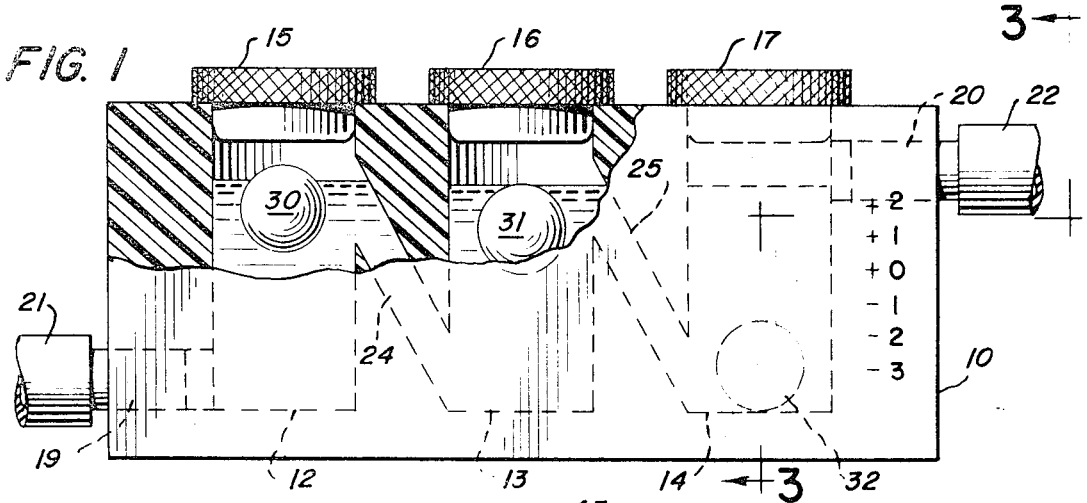
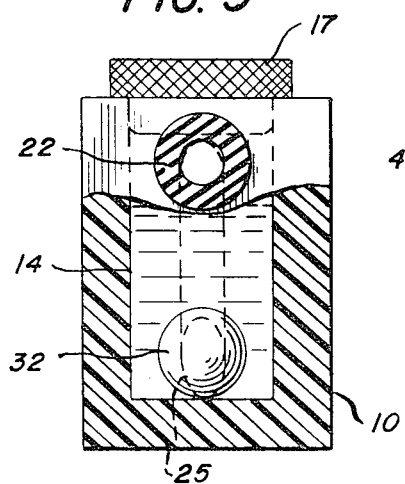
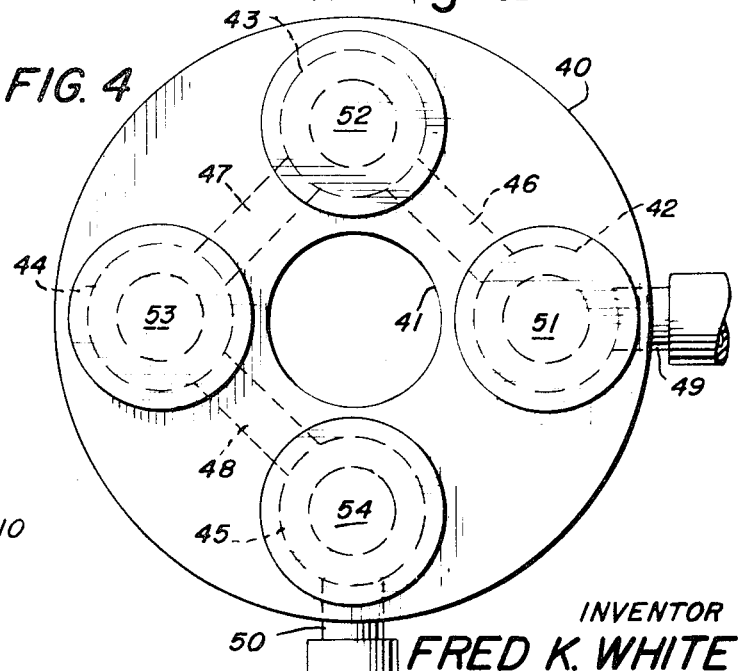
INVENTOR
FRED K. WHITE
BY John L. Hutchinson
ATTORNEY

DEVICE FOR MEASURING SPECIFIC GRAVITY OF FLUIDS

In various fields and for a variety of purposes it may be desirable to continuously monitor or test the specific gravity or density of a fluid. For example, monitoring the specific gravity or density of urine in patients is frequently an important factor in determining treatment, as the density of the urine may indicate the presence of disease or injury and a change can indicate response to treatment.

In many instances hygrometers have been used to determine specific gravity. However, such devices are normally used to determine the specific gravity of fluids on a batch basis and are generally not susceptible to a continuous monitoring system. Further, hygrometers are usually made of glass and hence, relatively expensive and therefore are not suitable for throwaway-type units, as may be desirable in many applications.

Accordingly, it is the principal object of this invention to provide a device for continuously monitoring and testing the specific gravity of fluids.

Another object is to provide a device of the foregoing type which is reasonably reliable within prescribed limits of accuracy.

A further object is to provide a device of the type indicated which is capable of being manufactured at relatively low cost in large volume.

These and other objects will become more apparent from the detailed description hereinafter presented and the associated drawing.

FIG. 1 is a vertical elevational view, partly in section, of the device contemplated herein.

FIG. 2 is a top plan view of the device of FIG. 1.

FIG. 3 is a view taken along line 3—3 of FIG. 1.

FIG. 4 is a top plan view of a modified form of the device.

Turning to the drawing and to FIGS. 1 to 3, the numeral 10 indicates the main body of the device which is normally made of a transparent material such as glass or, preferably, a plastic, exemplified by polystyrene or polymethacrylate. The body 10 contains a plurality of chambers such as the three chambers 12, 13 and 14 shown. Each of the chambers is open at the top and provided with a removable closure such as stoppers 15, 16 and 17, respectively thereby permitting access to the chambers.

An inlet passage 19 extends through the body 10 to the bottom of chamber 12 and an outlet passage 20 extends through the body 10 from the top of chamber 14. External hoses or tubes 21 and 22 may be connected to passages 19 and 20, respectively, to permit fluid to be introduced into and removed from the chambers as hereinafter described.

As is shown, the chambers are connected in series by passage 24, extending from the top of chamber 12 to the bottom of chamber 13 and passage 25 extending from the top of chamber 13 to the bottom of chamber 14. By disposing the passages 24 and 25 in the manner shown the movement of fluid completely through a chamber is assured, which may be of importance where changes in specific gravity are to be noted.

Each of the chambers is provided with a floatable element such as balls 30, 31 and 32. The balls may be made of any suitable material which will permit them to have a predetermined density and thus float at a predetermined specific gravity. Each ball may be made of the same material, for example nylon, wherein their difference in ability to float is accomplished by a difference in the degree of compacting during their formation.

A device such as shown in FIGS. 1-3 may be made by molding two complementary sections from, for example, polystyrene and then uniting the two sections together to form an integral unit. The balls may then be placed in the chambers and the chambers closed by the stoppers. When required the stoppers may be removed and the chambers and balls cleaned. Also for contrast and to more readily determine a given condition the balls may be made of different colors such as red, white and blue.

FIG. 4 represents a modification of the invention wherein the chambers of the device are disposed in circular relationship rather than in a linear relationship, as shown in FIGS. 1-3. The body 40 of this modified embodiment is formed in the shape of a cylinder with a central opening 41. It is apparent that such a body could be formed as a square or other desired design.

The modification of FIG. 4 consists of four chambers 42, 43, 44 and 45, although again any desired number of chambers may be employed. The chambers are connected in series by passages 46, 47 and 48 in the same manner as described for the embodiment of FIGS. 1 to 3, whereby the top of one chamber is connected to the bottom of the next chamber. Extending through body 40 are inlets 49 and outlet 50. The chambers are each provided with removable closures.

For purposes of describing the operation of the invention reference will be made primarily to testing the specific gravity of urine, which, as indicated, can be of critical importance in treatment of patients. In this regard the tube 21 of FIGS. 1 to 3 attached to inlet 19 may be connected at its opposite end to a catheter extending from the bladder of a patient. If desired, a sediment trap may be interposed within the line prior to inlet 19. Exit tube 22 may be connected to a collection vessel.

In using the device, balls of predetermined density will be inserted into each chamber, the density of the balls depending upon the specific gravity range expected or desired to be measured. For example, ball 30 may be formed such that it has a density permitting it to float at a specific gravity of 1, ball 31 may float at a specific gravity of 1.02 and ball 32 float at a specific gravity of 1.04.

Fluid to be analyzed is introduced through inlet 19 into chamber 12 filling the chamber. After reaching a level in chamber 12 at the upper opening of passage 24 the fluid will then flow down the passage and into chamber 13. When the latter chamber is filled to the desired level, chamber 14 will then be filled and the fluid then discharged from outlet 20 at the top of the last chamber.

Assuming a specific gravity of the urine of 1, as the urine is introduced into chamber 12, the ball 30 will float. As long as the specific gravity of the urine remains at 1, balls 31 and 32 will continue to rest on the bottom. If the specific gravity increases to 1.02 ball 31 will also float. Should the specific gravity increase to 1.04 ball 32 in chamber 14 will float. It can be seen that once all of the balls are in floating position a reverse change in the specific gravity of the patient's urine, such as may occur as the result of medication, will, correspondingly, result in one or more of the balls dropping to the bottom of the respective chambers.

The embodiments of FIG. 4 may be used in the same manner, with four chambers permitting a further range for an analysis of a given fluid.

In addition to the medical use described, the present device may be used in such fields as distillation operations, sewage treatment and similar applications.

Having described the invention and certain embodiments thereof, the same is only intended to be limited by the scope of the following claims.

1. A device for testing the specific gravity of a fluid comprising a unitary housing containing a plurality of separate laterally spaced vertically extending chambers formed therein, passages extending between chambers whereby said chambers are connected in series, a floatable element disposed in each chamber, each of said elements being adapted to float at a different predetermined specific gravity, and means for introducing said fluid into one end chamber of said series and means for permitting egress of said fluid from the opposite end chamber of said series.

2. A device as described in claim 1 wherein each chamber is provided with a removable closure.

3. A device as described in claim 1 wherein each of said floatable elements is a different color.

4. A device as described in claim 1 wherein the passages between chambers extend from the top of the prior chamber to the bottom of the next chamber in the series, wherein the means for introducing the fluid is disposed at the bottom of the first chamber in the series, and the means for permitting egress of said fluid is disposed at the top of the last chamber in the series.

5. A device as described in claim 1 wherein said chambers are disposed in substantially linear relationship.

6. A device as described in claim 1 wherein said chambers are disposed in a substantially circular relationship.

* * * * *